April 11, 1967 A. R. KNOWLES ET AL 3,314,037

HEATING ELEMENT

Original Filed Dec. 31, 1962 2 Sheets-Sheet 1

INVENTORS
ALVIS R. KNOWLES
VALDEMAR LOVICZ
BY
ATTORNEYS

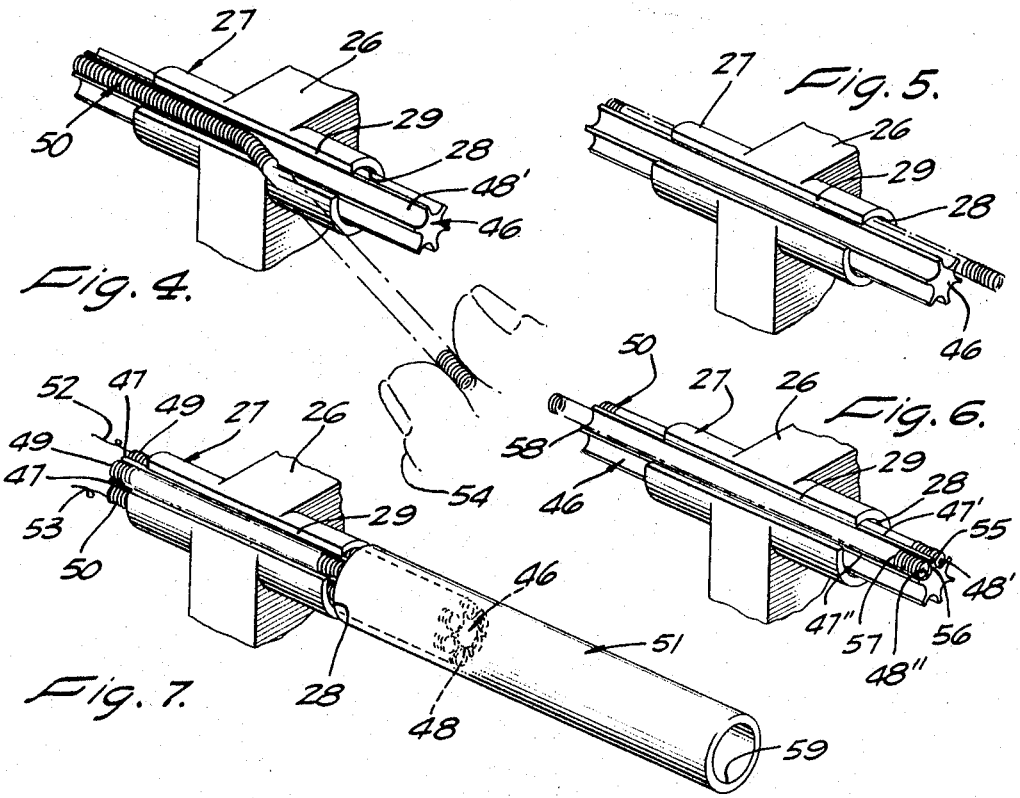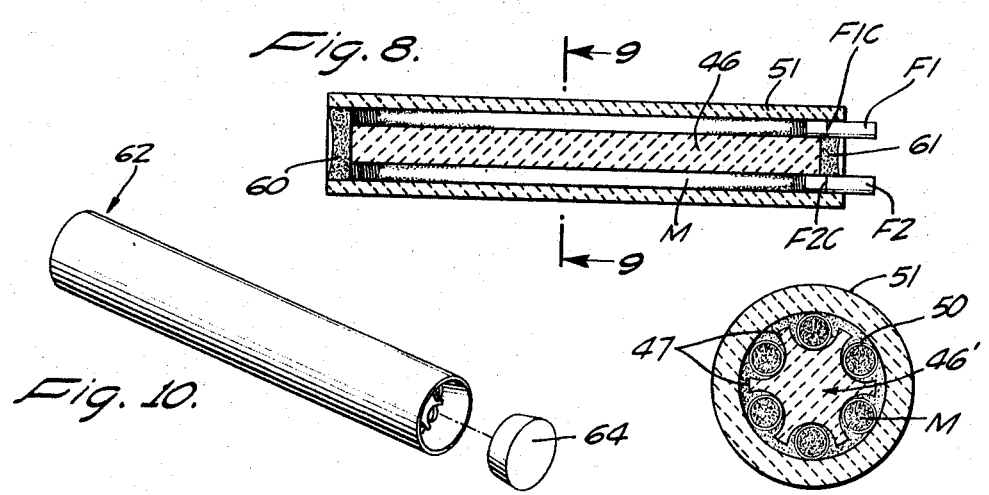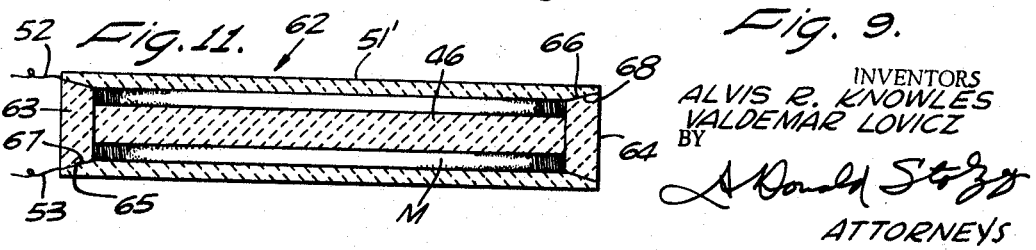

United States Patent Office 3,314,037
Patented Apr. 11, 1967

3,314,037
HEATING ELEMENT
Alvis R. Knowles, Torrance, and Valdemar Lovicz, Redondo Beach, Calif., assignors to Eldon Industries, Inc., Hawthorne, Calif., a corporation of California
Original application Dec. 31, 1962, Ser. No. 248,458, now Patent No. 3,233,637, dated Feb. 8, 1966. Divided and this application Feb. 25, 1964, Ser. No. 360,786
4 Claims. (Cl. 338—268)

This is a division of application Ser. No. 248,458, filed Dec. 31, 1962, now Patent No. 3,233,637, issued Feb. 8, 1966.

This invention relates to the electrical heating art, and more particularly to a ceramic enclosed wire, a process of encasing the wire, and a device for use in the process.

Although the present invention will no doubt have a great many applications other than those described later and should therefore not be limited to those specifically disclosed herein, the heating element of the present invention may be employed in soldering irons, wood burning irons and the like. The present invention also encompasses apparatus for use in fabricating such a heating element and a method of manufacturing it.

As stated previously, the present invention relates to a ceramic enclosed wire. This wire is heated by passing an electric current through it. Both the wire and its ceramic enclosure have been referred to herein as a heating element. The phrase "heating element" is therefore hereby defined for use herein as including either the wire by itself, or both the wire and any other structure connected with it including, but not limited to the ceramic enclosure thereof.

In the past, heating elements have been fabricated with three principal materials, namely, a steatite ceramic enclosure, a helically coiled wire, a magnesium oxide powder, and a ceramic cement. The ceramic enclosure has been made in the form of a solid cylinder except for several longitudinal passageways therethrough each having a cylindrical internal surface. The passageways are generally formed with a bore diameter slightly larger than the outside diameter of wire coil turns to receive the wire therein. In this connection, note will be taken that the larger wire coil diameter is to be distinguished from the size of the wire out of which the helix is made.

In the prior art the ceramic enclosure has been fabricated in a conventional manner with the use of a "straight" or conventional extrusion die of the spider type. After the fabrication of the ceramic and the wire helix, the helix is threaded through the passageways in the ceramic, the passageways in the ceramic are poured full of a magnesium oxide powder and the ends of the passageways are filled with a ceramic cement. The heating element so fabricated is heated to an elevated temperature. That is, it is baked for a length of time sufficient to cure the cement and drive out all residual moisture. In other words, the ceramic and wire are "potted" as that term is known in the art today.

Although the ceramic and the wire helix of the prior art are potted, each of the two ends of the wire are, of course, allowed to protrude through the cement, whereby electric current may be passed through the wire by electrically connecting a source of potential to the ends of the wire.

From the foregoing, it will be appreciated that the above-described prior art method for constructing a heating element is extremely tedious. That is, a tremendous amount of time and hand labor are required to thread the wire helix back and forth through the ceramic enclosure passageways. This is true because the size of the wire, the diameter of the helix turns or coils and the size of the ceramic enclosure passageways are extremely small.

The wire helix therefore cannot be threaded through the ceramic enclosure passageways except with extreme care and over a relatively long period of time.

In the past, due to the fact that it has been necessary to make the ceramic enclosure passageway substantially larger than the outside diameter of the helix turns, the wire helix has been relatively loosely positioned inside the ceramic enclosure passageway. This means that the wire helix may be damaged or broken due to vibration.

In addition to the foregoing, it sometimes is necessary to thread the wire helix through the ceramic enclosure passageways by pushing the same through and also by pulling the same through. The wire of the helix is of such a small size that pulling on the helix thereof frequently unnecessarily deforms the turns of the helix and increases the pitch thereof to an extent such that the heating capacity of the heating element thus fabricated is reduced. Note will be taken that only a certain amount of heat per unit length of the wire helix is generated and that by pulling the wire helix apart, the total length of the wire internally of the ceramic enclosure is decreased. Wire turns may also become crowded and the binding thereof can cause hot spots.

In accordance with the present invention, a method of making a heating element is provided including the steps of winding a length of wire onto a ceramic core and securing the ceramic body around the wound core.

According to a special feature of the present invention, such a method may be performed by placing a first length of wire in one of a plurality of longitudinal grooves defined between radially extending fins on a ceramic core, the fins all having the same lengths and being uniformly spaced around the core, the radial edges of the fins each being spaced the same distance from a symmetrical axis of the core along the length thereof, winding the wire over one end of the core, placing a second length of the wire in another of the grooves, placing a ceramic body around the core fins contiguous to the edges thereof, the body being open at least at one of its ends and having a cylindrical internal surface holding said lengths of the wire in their corresponding grooves, filling the open end of the body with cement to seal off the core and wire therein except for ends of the wire protruding outwardly of the cement, and baking the filled body to cure the cement and to drive out all residual moisture therein and through and inside the body.

Thus, according to the present invention, a heating element may be constructed easily and quickly in that the wire helix may be easily and quickly placed in the grooves of the ceramic core. Due to the fact that core grooves, at least temporarily, retain the wire helix rather than the ceramic enclosure passageways of the prior art, the easy access to the ceramic core grooves tremendously increases the fabrication rate of the heating element of the present invention without increasing the difficulty of the fabrication itself.

In accordance with another feature of the present invention, a jig is employed to hold the ceramic core and the wire helix in intermediate fabrication operations. This jig also increases the assembling speed of the heating element of the present invention considerably. This jig may include a fixture having a cylindrical bore to receive a longitudinal ceramic core having a plurality of longitudinal grooves therein, the fixture having a longitudinal slot therethrough of a size approximately the same as that of the grooves.

By using the jig of the present invention, it may be seen that the wire helix may be easily located in one of the ceramic core grooves at a time. The fixture may thus be employed at different points during the fabrication process and each time the wire helix is laid in a ceramic core groove effectively to "cover up" all of the grooves except a particular one which has been selected for the purpose of having the wire helix laid in it.

In accordance with a feature of the present invention, a projection is provided on the jig to extend longitudinally toward one end of the fixture bore along the axis thereof from the exterior thereof. According to a feature of the present invention, the projection is provided with one end adjacent a fixture bore opening smaller in size than the diameter of the fixture bore and therefore smaller in size than the ceramic core. The small size or point of a tapered projection may thus serve, at the center of the ceramic core, as a low-friction bearing point.

According to still another feature of the present invention, the said pointed end of the projection may be spaced longitudinally away from the fixture along its bore axis to permit the core to be located in a position in the bore extending from it to the said pointed end of the projection. By the projection point being spaced from the end of the fixture, the exposed end of the ceramic core may thus be rotated while it rests in the fixture bore so that the wire helix may be placed in successive grooves around the circumference of the core. At the same time, the cylindrical bore of the fixture holds portions of the wire helix which already have been placed in certain grooves around the core.

In accordance with a special feature of the present invention, the fixture is slotted into the bore thereof an extent approximately equal to but a little larger than the diameter of the turns of the wire helix in order that the helix may be passed therethrough and laid in a core groove.

According to an outstanding feature of the present invention, a projection similar to the one described hereinabove is provided at each end of the fixture bore. The projections are spaced apart a distance only slightly greater than the length of the core to maintain the same in an approximately stationary axial position within the fixture bore. Accordingly, one of the projections is mounted in a manner to be movable away from its corresponding end of the fixture to permit a wound core to be ejected from the fixture bore.

In accordance with the foregoing, it will be apparent that the slot in the fixture may be straight, if desired.

According to other features of the present invention, the movable projection may be rotatable about an axis parallel to the fixture bore axis and stops may be provided to limit rotation of the movable projection in either direction about its axis. In addition, the stops may be positioned in a manner such that the movable projection may be gravity held in either one of two fixed positions when corresponding ones of the stops are engaged.

In accordance with the present invention, the heating element thereof may be fabricated with the use of the jig of the present invention by employing the steps of placing a ceramic core in a fixed longitudinal cylindrical bore of a fixture, said core having a plurality of fins extending outwardly thereof in a radial direction defining longitudinal grooves therebetween, the fixture having a longitudinal slot therethrough of a size approximately the same as that of each of the grooves, the core being placed in the fixture with a groove therein in alignment with the fixture slot, placing a first length of wire in a first of the core grooves, rotating the core in the fixture bore until a second empty groove falls into alignment with the fixture slot, and placing the wire in the second empty core groove.

In accordance with a special feature of the present invention, the jig may also be employed using the steps of placing a ceramic core in a fixed longitudinal cylindrical bore of a fixture having jig means providing substantially a central point contact with the ends of the core to retain the same in a substantially fixed longitudinal position but rotatable in the cylindrical bore, the fixture being shorter than the core to expose at least one end thereof, the core having a plurality of longitudinal fins extending outwardly thereof in a radial direction defining longitudinal grooves therebetween, the fixture having a longitudinal slot therethrough of a size approximately the same as that of each of the grooves, the core being placed in the fixture with a groove therein in alignment with the fixture slot, placing a first length of wire in a first of the core grooves, grasping the exposed end of the core, rotating the core until a second empty core groove falls into alignment with the fixture slot, winding the wire over one end of the core, placing the wire in the second empty core groove, removing one of the jig means providing a point contact on a certain end of the core, holding a ceramic cylinder adjacent the certain end of the core in alignment with the fixture bore, moving the wire wrapped core out of the fixture bore and, simultaneously, into the bore of a ceramic cylinder, and sealing the ceramic cylinder shut with the wire wrapped core positioned therein and with the ends of the wire extending outwardly of the seal thereof.

From the foregoing, it will be appreciated that the jig of the present invention and the method of its use makes the assembly of the heating element thereof easy to perform within a relatively short period of time. In particular, the slot through the fixture makes it possible to place the wire helix in a core groove easily and in a very short time. The fixture bore also retains other portions of the wire helix so placed. The bearing points of the jig projections makes it easy to turn the ceramic core in the fixture bore. This may also be done in a very short time.

The spacing of the jig projection bearing points also makes the core easily accessible to manual turning thereof in the fixture bore for a rapid assembly. The movable character of the movable projection makes it also possible, with its spacing from the fixture, to locate a ceramic cylinder around the assembled or wound core both easily and quickly.

In accordance with another outstanding feature of the present invention, it is possible to make the ceramic cylinder bore and the outside diameter of the wire helix turns of sizes such that a snug fit will exist between the wire helix and the ceramic cylinder. This means that the wire helix is positively held between the core groove surface and the ceramic cylinder bore. This also means that the heating element of the present invention is sturdier and stronger than those of the prior art. The wire helix of the present invention, in addition, cannot become damaged or break due to vibration as in the case of heating elements of the prior art.

The wire helix of the present invention is held more securely between the ceramic core and the ceramic cylinder of the present invention because, by the ceramic cylinder engaging each of a plurality of portions of the wire helix, a snug fit may be accomplished without damaging the wire helix.

In addition to the foregoing, it will be noted that a heating element made in accordance with the present invention will have a maximum heating capacity because it is not necessary to stretch the wire helix of the present invention in the assembly thereof as in the case of the assembly of the wire helix in the ceramic enclosure passageways of the prior art.

It is also an outstanding feature of the present invention that a thorough inspection can be made of helix windings to prevent binding and hot spots, the same being impossible in the inaccessible ceramic enclosure passageways of the prior art.

In accordance with the present invention, the heating element thereof may be filled with magnesium oxide powder and potted in a conventional manner or, ceramic plugs may be cemented to the ends of the ceramic cylinder and the cemented heating element thereafter baked.

The above-described and other advantages of the present invention will be better understood from the following description when considered in connection with the accompanying drawings.

In the drawings which are to be regarded as merely illustrative:

FIG. 4 is a broken away perspective view of a portion of the jig shown with a ceramic core and wire helix;

FIGS. 5, 6 and 7 are views similar to FIG. 4 illustrating subsequent steps of the method of the present invention;

FIG. 8 is a longitudinal sectional view of a heating element constructed in accordance with the present invention;

FIG. 9 is a transverse sectional view taken on the line 9—9 of the heating element shown in FIG. 8;

FIG. 10 is an exploded perspective view of an alternative embodiment of the heating element of the present invention; and FIG. 11 is a longitudinal sectional view of the embodiment of the invention shown in FIG. 10.

Figure 1:
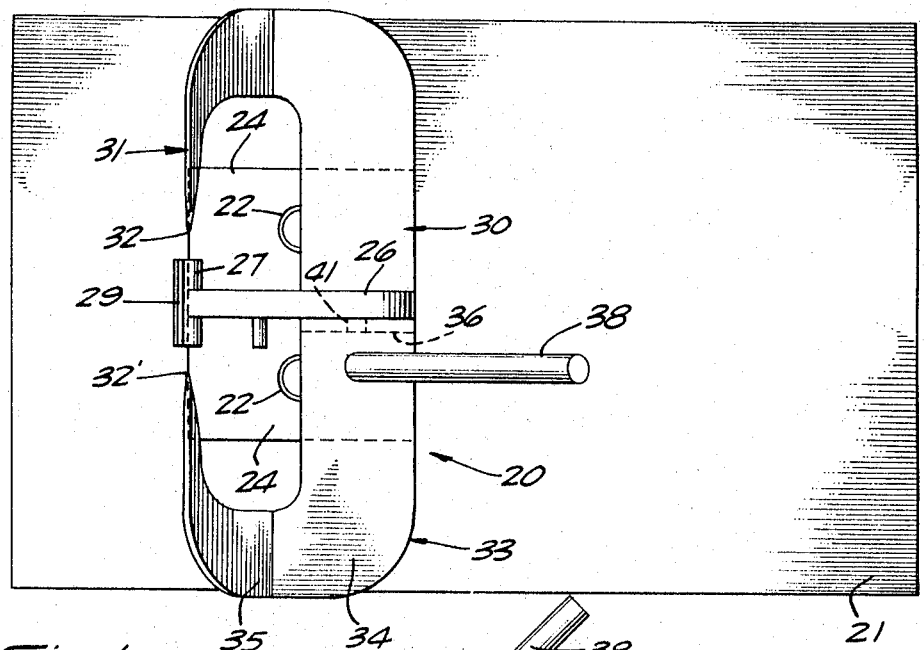
FIG. 1 is a top plan view of a jig constructed in accordance with the present invention and which may be used in the method thereof of making the heating element of the present invention.

In the drawings in FIG. 1, a jig 20 is shown which is mounted on a table 21 by a pair of bolts 22 that extend through bores 23 in flanges 24 respectively of jig 20 and are threaded into table 21 in bores 25.

Flanges 24, if desired, may be made of one continuous flat metal plate. A vertical flat metal plate 26, forming a part of jig 20, then may be welded to plate 24. Plate 26 carries a fixture 27 fixed thereto that has a hollow cylindrical bore 28 and a slot at 29 therethrough into bore 28.

Figure 3:
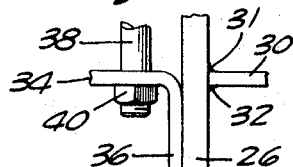
FIG. 3 is a broken away rear elevational view of the jig shown in FIGS. 1 and 2.

An arm 30 is welded to plate 26 as at 31 and 32, as shown in FIG. 3. A projection 31 is formed as an integral part of arm 30. Projection 31 is tapered toward fixture 27 and terminates at a relatively small point 32.

Figure 2:
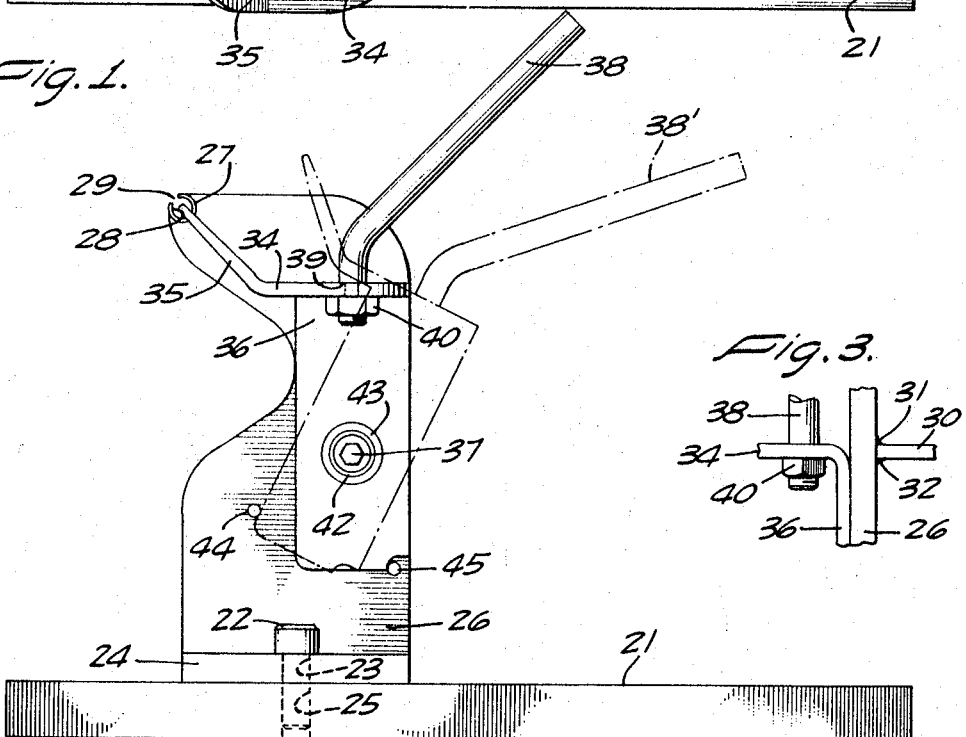
FIG. 2 is a side elevational view of the jig shown in FIG. 1.

An arm 33 similar to arm 30 is also provided on the plate 26 opposite the side on which arm 30 is positioned. Arm 33 is provided with portions at 34 and 35 which are identical in shape to corresponding symmetrical portions of arm 30. However, arm 33 is also provided with a vertical portion 36, as shown in FIGS. 2 and 3, which is rotatable about a horizontal axis at 37 parallel to the axis of fixture bore 28.

Arm 33 is provided with a handle 38 with a shoulder 39 thereon to engage the upper surface of arm 33. Handle 38 is held in a fixed position relative to arm 33 by a nut 40 which is threaded to the lower end of handle 38.

Vertical portion 36 of arm 33 is provided with a hole 41 therethrough through which the shank, not shown, of an Allen head screw 42 projects and is threaded into vertical plate 26. Screw 42 thus has an axis identical with axis 37. Screw 42 holds arm 33 in a position with portion 36 thereof parallel to plate 26. A washer 43 is provided under the head of screw 42.

Cylindrical stops at 44 and 45 are welded to plate 26. Stop 45 prevents arm 33 and the structure fixed therewith from rotating to the left beyond the position shown in solid lines in FIG. 2. Similarly, stop 44 prevents arm 33 and the structure fixed therewith from rotating to the right beyond a position shown in dotted lines 38' in FIG. 2.

The materials of which the heating element of the present invention are made, with the exception of means to seal the element shut, a magnesium oxide filler, and clinched ferrule heads are shown in FIG. 7 including a ceramic core 46 having radially extending fins 47 defining grooves 48 into which portions 49 of a wire helix 50 have been placed. A hollow cylinder 51 has been located around the right end of wire helix 50 and core 46. Note will, however, be taken that leads to the helix 50 exist at 52 and 53 and leads 52 and 53 are not to be confused to the "end" of helix 50 referred to in the sentence immediately preceding this sentence.

The first step in the method of the present invention may be the insertion of the core 46 into fixture bore 28 to a position such that its end contacts point 32 of projection 31. Core 46 is of course inserted to this position while arm 33 is maintained in the dotted line position shown at 38' in FIG. 2. Arm 33 is then rotated to the solid line position shown in FIG. 2 and helix 50 is laid in a groove 48' manually as indicated at 54 in FIG. 4.

After this has taken place, core 46 is rotated to the position shown in FIG. 5. Helix 50 is then wound over an end 55 of a fin 47' as at 56 and laid in another groove 48" as at 57, shown in FIG. 6.

After the steps illustrated in FIGS. 4, 5 and 6 have been performed, these steps are repeated until all the grooves 48 of core 46 are filled with wire helix 50. Helix 50 is first wound over, for example, end 55 of fin 47'. In the step succeeding that shown in FIG. 6, helix 50 will be wound around an end 58 of a fin 47". Helix 50 thus, until core 46 is completely wound, extends around alternate opposite ends of fins 47 in the same manner that it is wound around ends 55 and 58 of fins 47' and 47" respectively.

After portions of helix 50 have been placed in each of the grooves 48 of core 46, arm 33 is moved to the dotted line position 38' again, and cylinder 51 is located over the wound end of core 46 exposed to the right of fixture 27 as shown in FIG. 7. Cylinder 51 is held adjacent to or in contact with the right end of fixture 27 as shown in FIG. 7 and core 46 with helix 50 lying within each groove 48 thereof is moved out of fixture bore 28 and, at the same time, into a cylindrical bore 59 in cylinder 51. Core 46 is then centrally located in cylinder 51 and the end of cylinder 51 at which electrical leads are positioned is cemented shut with a ceramic cement. The interior of cylinder 51 is filled with a magnesium oxide powder. The cylinder 51 is subsequently vibrated to pack the powder. After the powder filler excess is smooth at the other end of the cylinder 51, it is likewise sealed shut in the same manner as the said one end is cemented. The assembly is then potted. For example, cement is shown at 60 and 61 filling the ends of cylinder 51 in between which magnesium oxide powder M is packed. The leads to helix 50 at 52 and 53 are positioned inside metal cylindrical ferrule leads F1 and F2 which are indented or clinched at F1C and F2C to fix the same to the helix leads. Ferrules F extend outwardly of cylinder 51 through the cement. All of these structures are shown in FIGS. 8 and 9. The structures shown in FIGS. 8 and 9 are baked with cement at 60 and 61 in cylinder 51 to cure the cement and to drive out all residual moisture therein and throughout and inside of cylinder 51.

An alternative embodiment of the heating element of the present invention is also shown in FIG. 10. Tapers at 67 and 68 are provided in the end of a ceramic cylinder 51'. Cylinder 51' may, except for the tapers at 67 and 68, be identical to cylinder 51. The ends of cylinder 51 may be closed, alternatively, with two plugs as indicated at 63 and 64 in FIG. 11. Plug 54 is also shown in perspective view in FIG. 10. Plugs 63 and 64 are cemented in the ends of cylinder 51' as at 65 and 66, shown in FIG. 11. As before, leads 52 and 53 extend outwardly of cylinder 51' through cement 65 and 66 respectively. As before, the assembly 62 and plugs 63 and 64, as assembled in FIG. 11 and cemented together, may be baked to cure the cement at 65 and 66 and to drive out all residual moisture in the cement and through and inside the cylinder 51'.

Also, as before, helix 50 and magnesium oxide M may be employed.

Although, in accordance with the broad method of the present invention, the product thereof, and the jig shown in FIGS. 1, 2 and 3, are not necessarily critical to the practice of the invention, core 46 and cylinders 51 and 51′ and plugs 63 and 64 all may be made of conventional heating element materials, such as steatite or porcelain. Helix 50 may be made of conventional heating element conductive materials. Cement 60, 61, 65 and 66 may be conventional ceramic cement.

In accordance with the present invention, and according to the foregoing, it is believed that it is now apparent, as stated previously, that the method and apparatus of the present invention may be used easily to fabricate the heating element of the present invention in a period of time much shorter than that required to fabricate heating elements of the prior art. In particular, easy access is provided to grooves 48 in core 46, whereas the same was not possible in the enclosed passageways of prior art ceramic bodies employed in heating elements. Note will also be taken that the cylindrical bore 59 of cylinder 51 retains helix 50 in grooves 48 of core 46, as shown in FIG. 9, in a secure position therein.

In addition to the foregoing, point 32 of projection 31 serves as a stop and as a low-friction bearing contact point approximately at the center of the left end of core 46 as viewed in FIG. 4. The fact that it acts as a stop makes the assembly of core 46 in fixture bore 28 easy. The same may also be performed quickly. Core 46 may also be turned in fixture bore 28 as shown in FIGS. 4 and 5 against the low-friction point bearing at 32 on projection 31. The same is true of the point of portion 35 of arm 33 indicated at 32′ in FIG. 1.

The cylindrical bore 28 of fixture 27 easily retains the portions of helix 50 laid in grooves 48 of core 46 as shown in FIG. 5.

The straight longitudinal character of fixture slot 29 makes it an easy matter to lay a portion of helix 50 in a groove 48 of core 46. This may also be done very rapidly. The fact that slot 29 is of an angular width less than 180° and approximately equal to the width of grooves 48 in core 46 also speeds the assembly process of helix 50 in grooves 48. In the initial step of placing core 46 in fixture bore 28, grooves 48′ will of course be aligned with slot 29. The same is true, as aforesaid, when slot 48″ is aligned therewith as shown in FIG. 6.

Note will be taken that points 32 and 32′ are spaced from the ends of fixture 27 to expose both ends of core 46 so that it may be easily turned manually as indicated at FIGS. 4 and 5.

The movable character of arm 33 about axis 37 thus makes it possible to retain core 46 in a secure position in fixture 27 when helix 50 is being placed in grooves 48 in core 46. The movable character of arm 33 also makes it possible to assemble cylinder 51 over core 46 and the portions of helix 50 in grooves 48 of core 46 as shown in FIG. 7.

The heating element of the present invention is sturdier and stronger than heating elements of the prior art. The heating element of the present invention is also more vibration free than heating elements of the prior art. Note will be taken that portions of helix 50 are held positively and snugly in grooves 48 of core 46 as shown in FIG. 9 by cylinder 51.

As stated previously, the portions of the wire helix in the ceramic enclosure passageway of the prior art are necessarily rather loosely held therein, the same is not true of the secure compression of portions of helix 50 against the surfaces of grooves 48 as shown in FIG. 9.

Also as stated previously, by the snug fit of cylinder 51 against the portions of helix 50 in grooves 48 of core 46, helix 50 is prevented from being damaged or broken due to vibration, whereas the same was not possible in the structure of prior art heating elements. Note will be taken that this effect is facilitated by the direct contact of the bore 59 of cylinder 51 with a plurality of portions of helix 50 in several different grooves 48 of core 46.

Still further, due to the fact that it is not necessary to pull or push portions of helix 50 through any passageways, and due to the fact that they may simply be laid in grooves 48, the curvature of the turns of helix 50 will not be deformed. The same is true in the mounting of cylinder 51 around core 46 and the portions of helix 50 located in the grooves 48 thereof.

Maximum heating capacity is achieved in accordance with the heating element of the present invention in the assembly thereof in that a maximum length of helix 50 is assembled in cylinder 51 or cylinder 51′.

Note will also be taken that binding of helix turns and hot spots produced by threading a helix through the prior art ceramic enclosure passageways are avoided in accordance with the present invention in that inspection is permitted. That is, a close visual inspection of the helix 50 in grooves 48 of core 46 may easily be made although the same was not possible inside the inaccessible ceramic enclosure passageways of the prior art.

Note will be taken from FIG. 8 that core 46 and cylinder 51 have uniform cross sections throughout their lengths. Core 46 is also symmetrical about its longitudinal central axis. It is true, that in accordance with the present invention, wire helix or heating coil 50, by itself, is not new; however the construction of the heating element of FIG. 8 is new. Note will be taken especially that cylinder 51 has a cylindrical surface both internally and externally thereof.

Note will be taken in FIG. 9 that the ends of fins 47 are spaced a short distance from the internal cylindrical surface of cylinder 51. Note will also be taken from FIG. 9 that fins 47 extend partially around each portion of wire helix 50 but that fins 47 extend around wire helix 50 an angular extent of less than 180°. Were this not the case, wire helix 50 of course could not be laid in grooves 48 without stretching the turns of wire helix 50 and thereby causing non-uniform heating of the heating element when it is put to use.

As regards modifications of core 46 and cylinder 51, note will be taken that the method of the present invention may be practiced and the heating element thereof constructed with a ceramic cylinder having one end closed prior to the time that the same is assembled. Further, it may be easier to extrude core 46 with a uniform accurate cross section with a cylindrical hole through the center thereof. However, no wire helix would be placed therein in such a case.

If desired, the helix 50 may be fabricated in a special way to facilitate its assembly. In the first place, a spring wire may be wound on a cylindrical mandrel with the turns thereof in contact with one another. For placing six continuous sections of the helix in the six corresponding core grooves 48 of core 46, the continuous helix may, in fact be divided into six sections by linearly spreading a few of the turns thereof apart at five points along its length. These deformed or reformed linear portions will then fit around the ends of core fins 47. In assembly, the undeformed spiral turns of the helix are pulled apart slightly although no pronounced or discernible separation has been illustrated in the drawings.

In the assembly of helix sections made as described above, the two center sections thereof may be manually assembled prior to the time that helix 50 and core 46 are placed in fixture bore 28, if desired. The other four helix sections may then be located in corresponding core grooves 48 in any desired sequence so long as no linear helix section connecting portion crosses over another such portion. In such a case, both ferrules F will extend from the same end of cylinder 51. Note will be taken that ferrules F may be clinched to wire ends 52 and 53 prior to the time that helix 50 is wound on core 46.

Although several specific embodiments of the invention have been described or illustrated, many changes and modifications to the invention will suggest themselves to those skilled in the art. Those embodiments of the present invention selected for this disclosure have been so selected for the purpose of illustration only. The invention therefore is not to be limited to the embodiments selected for this disclosure, the true scope of the invention being defined only in the appended claims.

What is claimed is:

1. A heating element comprising: a longitudinally extending ceramic core of uniform cross section throughout its length, said core being symmetrical about its longitudinal axis, said core having axially straight, radially extending fins defining grooves therebetween; a heating coil including a filament-like wire coiled into a helix and positioned in said grooves; a hollow, cylindrical ceramic body extending around said core fins spaced a finite distance from the edges thereof holding said wire in said grooves, said helix fitting snugly between said core and said body, each pair of mutually adjacent fins extending around said helix an angular extent less than 180 degrees whereby turns of said helix are undistorted when assembled with said core; a refractory powder packed inside said body around said wire and said core; and means sealing the ends of said body shut, said means including electrically non-conductive material at each end of said body and a low resistance conductor fixed to each end of said wire and projecting through said electrically non-conductive means material at one end of said body.

2. The invention as defined in claim 1, wherein said powder is magnesium oxide.

3. The invention as defined in claim 1, wherein said grooves have generally cylindrical surfaces, said groove surfaces having a radius of curvature larger than the radius of said helix.

4. The invention as defined in claim 1, wherein said body has concentric cylindrical internal and external surfaces.

References Cited by the Examiner
UNITED STATES PATENTS

| | | | |
|---|---|---|---|
| 1,234,499 | 7/1917 | Smalley | 219—390 |
| 1,463,005 | 7/1923 | Dalton | 338—261 |
| 2,280,367 | 4/1942 | Barton | 338—241 |
| 2,703,833 | 3/1955 | Vanvor | 338—28 |
| 2,824,199 | 2/1958 | Browne | 338—241 |
| 3,005,171 | 10/1961 | Beckman | 338—28 |
| 3,107,290 | 10/1963 | Willinger | 219—523 X |

FOREIGN PATENTS 538,584    3/1957    Canada.

ANTHONY BARTIS, *Primary Examiner.*

RICHARD M. WOOD, *Examiner.*

V. Y. MAYEWSKY, *Assistant Examiner.*